US012198878B1

(12) United States Patent
Zhao

(10) Patent No.: US 12,198,878 B1
(45) Date of Patent: Jan. 14, 2025

(54) QUICK RELEASE STRUCTURE FOR A KEYBOARD

(71) Applicant: Shaodong Tongchi Technology Development Co., Ltd, Shaoyang (CN)

(72) Inventor: Juan Zhao, Changsha (CN)

(73) Assignee: Shaodong Tongchi Technology Development Co., Ltd, Shaoyang (CN)

(*) Notice: Subject to any disclaimer, the term of this patent is extended or adjusted under 35 U.S.C. 154(b) by 0 days.

(21) Appl. No.: 18/739,913

(22) Filed: Jun. 11, 2024

(30) Foreign Application Priority Data

May 24, 2024 (CN) ........................ 202421152827.X

(51) Int. Cl.
*H01H 13/86* (2006.01)
*B41J 29/13* (2006.01)
*H01H 13/04* (2006.01)

(52) U.S. Cl.
CPC ............ *H01H 13/86* (2013.01); *H01H 13/04* (2013.01); *B41J 29/13* (2013.01)

(58) Field of Classification Search
CPC .......... B41J 29/13; H01H 13/04; H01H 13/86
See application file for complete search history.

(56) References Cited

U.S. PATENT DOCUMENTS 5,513,754 A * 5/1996 Chang .................. A45C 11/008 206/581
6,057,547 A * 5/2000 Park ....................... B82Y 35/00 977/851
6,549,189 B1 * 4/2003 Zarek .................. G06F 3/03547 345/167
11,630,524 B1 * 4/2023 Comito, II .............. G06F 3/021 345/41
2007/0158891 A1 * 7/2007 Stark .................... B23Q 1/0072 269/309
2008/0061486 A1 * 3/2008 Kuroda .................. B23Q 3/183 269/48.1
2010/0090442 A1 * 4/2010 Votruba ................. B60D 1/065 280/511

(Continued)

FOREIGN PATENT DOCUMENTS

CN 201741101 U 2/2011
CN 201965508 U 9/2011

(Continued)

*Primary Examiner* — David H Banh
(74) *Attorney, Agent, or Firm* — George D. Morgan

(57) ABSTRACT

The present invention relates to a quick release structure for a keyboard, which allows users to quickly remove and assemble the keyboard using a quick release ball structure between the top case and bottom case of the keyboard instead of tools and is more convenient compared to traditional keyboards requiring tools to remove ribbon cables and screws. Further, a PCB board is designed to connect to the Type-C interface inside the keyboard via a PIN magnetic connector. The PIN magnetic connector is an interface technique that uses magnetic force to achieve quick connection and disconnection. It usually consists of a magnetic male socket and a magnetic female socket with PINs, which are automatically connected via magnetic force. The quick release ball structure and PIN magnetic connector achieve ultimate quick release of the keyboard, making it convenient for keyboard maintenance and modification.

8 Claims, 8 Drawing Sheets

(56) References Cited

U.S. PATENT DOCUMENTS

| | | | | |
|---|---|---|---|---|
| 2010/0219574 A1* | 9/2010 | Stark | B23Q 1/0072 269/309 |
| 2010/0308524 A1* | 12/2010 | Kitaura | B23Q 1/0081 269/309 |
| 2016/0070124 A1* | 3/2016 | Liu | G02F 1/0134 385/11 |
| 2019/0093702 A1* | 3/2019 | Tiefenbrunn | F16C 11/106 |
| 2021/0206217 A1* | 7/2021 | Angermann | B62D 53/08 |
| 2022/0041025 A1* | 2/2022 | Garcia | E05B 67/383 |
| 2023/0185690 A1* | 6/2023 | Morrison | G06F 1/1658 361/679.27 |

FOREIGN PATENT DOCUMENTS

| | | |
|---|---|---|
| CN | 218471820 U | 2/2023 |
| CN | 218497471 U | 2/2023 |

* cited by examiner

QUICK RELEASE STRUCTURE FOR A KEYBOARD

CROSS-REFERENCE TO RELATED APPLICATIONS

The application claims priority to Chinese patent application No. 202421152827X, filed on May 24, 2024, the entire contents of which are incorporated herein by reference.

TECHNICAL FIELD

The present invention relates to the field of keyboard technology, specifically to a quick release structure for a keyboard.

BACKGROUND

A keyboard is a device for inputting instructions and data. A keyboard mainly comprises a bottom case, a circuit board, a middle board, and a top case. The circuit board and the middle board are fixed inside the bottom case via the top case, and a plurality of keys are installed on the middle board. For example, patent document No. 202111140708.3 discloses a keyboard, which comprises a bottom case and a key module. The key module is arranged on the bottom case, and the key module comprises a plurality of key units. Each key unit comprises a key cap, a first spring arm, and a second spring arm. The key cap has a bottom surface, an opposite first and second side, and an opposite third and fourth side. The first spring arm comprises a first fixing portion, which is fixed near the fourth side. One end of the first spring arm is connected to the first side and extends towards the direction of the fourth side from a position close to the third side. The second spring arm comprises a second fixing portion, which is fixed near the fourth side. One end of the second spring arm is connected to the second side and extends towards the direction of the fourth side from a position close to the third side. The other end of the second spring arm is connected to the adjacent first spring arm.

However, in order to improve the stability of the connection between the bottom case and the top case of the keyboard mentioned above, screws are usually used to fix the connection between the bottom case and the top case. However, with the use of screw for fixation, it is not convenient to achieve quick release between the top case and the bottom case, which brings inconvenience to the installation or release of the keyboard for later maintenance. Therefore, we need to put out a quick release structure for the keyboard to solve the above-mentioned issue and make the installation or release between the bottom case and the top case convenient.

SUMMARY

The purpose of the present invention is to provide a quick release structure for a keyboard, which uses the spring clamping force between two spring loaded ball units to clamp and fix the connection section of the connection mechanism, so as to quickly install the top case and the bottom case. When removing, the connection mechanism is detached by directly pulling the top case away from the bottom case, which improves the convenience of installing or removing the bottom case and the top case, and solves the issue raised in the background of the invention.

To achieve the above objective, the present invention provides the following technical solution: a quick release structure for a keyboard, comprising: a top case and a bottom case, wherein the top case and the bottom case are detachably connected via a quick release ball structure.

Preferably, the quick release ball structure comprises a lock unit and a clamping base, wherein the lock unit is disposed with an arc-shaped surface, the clamping base is disposed with a pair of support units forming a clamping opening, the two support units are arranged with a spring loaded ball unit inside, and the lock unit is inserted into the two support units and locked by the spring loaded ball unit.

Preferably, the spring loaded ball unit comprises a ball and a spring, a cavity is disposed on the support unit for the installation of the ball and the spring, at least a portion of the ball is exposed outside the cavity, and the ball located in the cavity is pressed against one end of the spring. The other end of the spring is arranged with an adjustment mechanism for adjusting the clamping force of the ball.

Preferably, the adjustment mechanism comprises an adjustment unit, the side wall of the adjustment unit is disposed with an external threaded section, and the cavity is disposed with a screw hole for the adjustment unit to be screwed in.

Preferably, the lock unit comprises a fixing plate arranged around the edge of the top case and a limit protrusion arranged on the fixing plate, and the curved surfaces are arranged on both sides of the limit protrusion.

Preferably, the cross-section of the curved surface is in an arc shape, and the curved surface corresponds to the spring loaded ball unit.

Preferably, the limit protrusion is integrally formed with the fixing plate, and the limit protrusion and the fixing plate form a T-shaped structure.

Preferably, it further comprises a PCB board, one side of the bottom case is disposed with a Type-C interface, and the PCB board is connected to the Type-C interface inside the keyboard via a PIN magnetic connector.

Preferably, the PIN magnetic connector comprises a magnetic male socket fixed to the circuit board inside the keyboard and a magnetic female socket installed on the bottom case, the magnetic male socket is magnetically attached to the magnetic female socket, the magnetic female socket is fixed inside the cavity via a support unit, a receiver is arranged between the bottom case and the support unit, and one side of the magnetic female socket is electrically connected to the Type-C interface.

Preferably, the bottom of the bottom case is disposed with a cavity for installing a PIN magnetic connector and accommodating the receiver, and a magnetic protective cover is detachably installed at the opening of the cavity.

Compared with the prior art, the beneficial effects of the present invention are as follows:

The present invention fixes the clamping base onto the bottom case of the keyboard via the coordination of the clamping base, the fixing plate, the connection mechanism and the spring loaded ball unit, and then fixes the fixing plate on the top case of the keyboard. When the clamping base and the fixing plate are connected via the connection mechanism, the spring clamping force between the two spring loaded ball units is used to clamp and fix the connection section of the connection mechanism, so as to quickly install the top case and the bottom case. When removing, the connection mechanism is detached by directly pulling the top case away from the bottom case, and it is easy in operation, and the screw does not need to be screwed frequently, which improves the convenience of installing or removing the bottom case and the top case.

Figure 1:
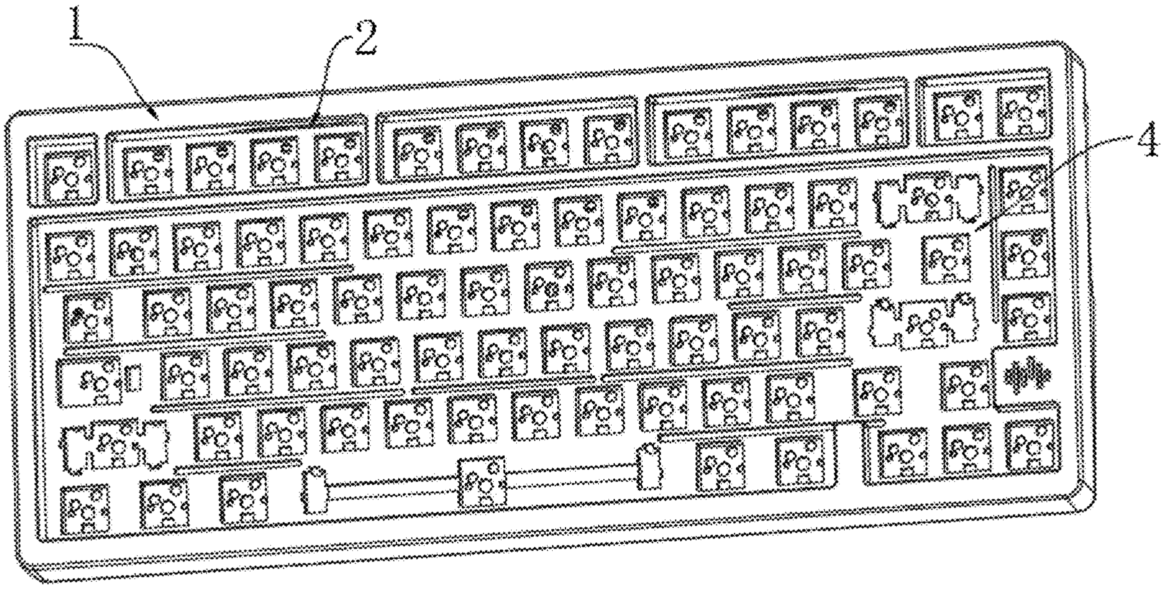
FIG. 1 is a structural schematic diagram of the quick release ball structure of the present invention when installed between the bottom case and the top case.
Figure 2:
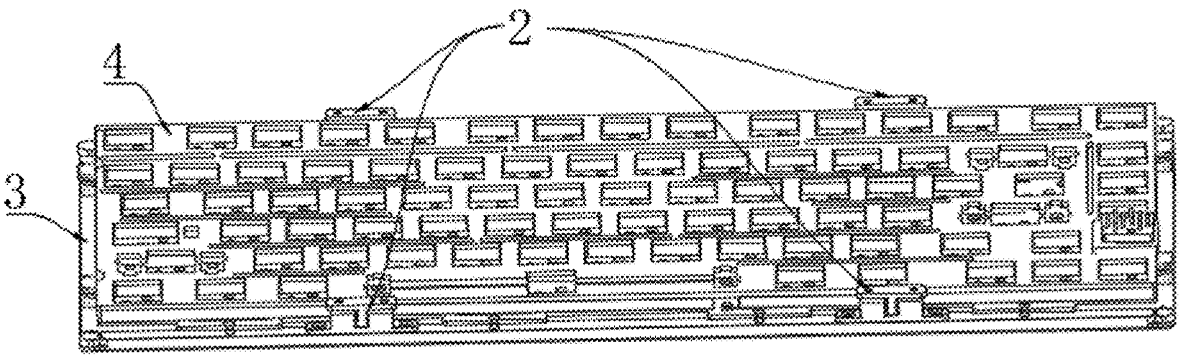
FIG. 2 is a structural schematic diagram of the installation position of the quick release ball structure and the bottom case of the present invention.
Figure 3:
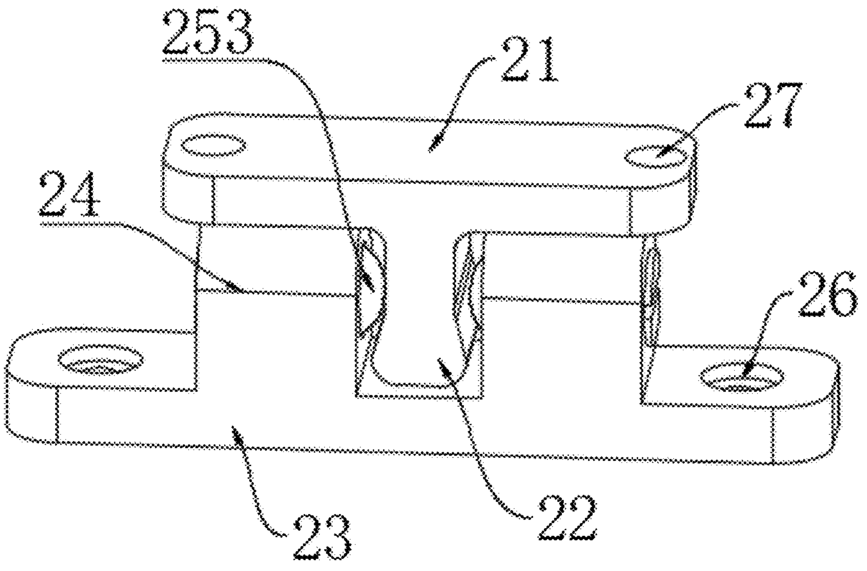
FIG. 3 is a schematic diagram of the quick release ball structure of the present invention.
Figure 4:
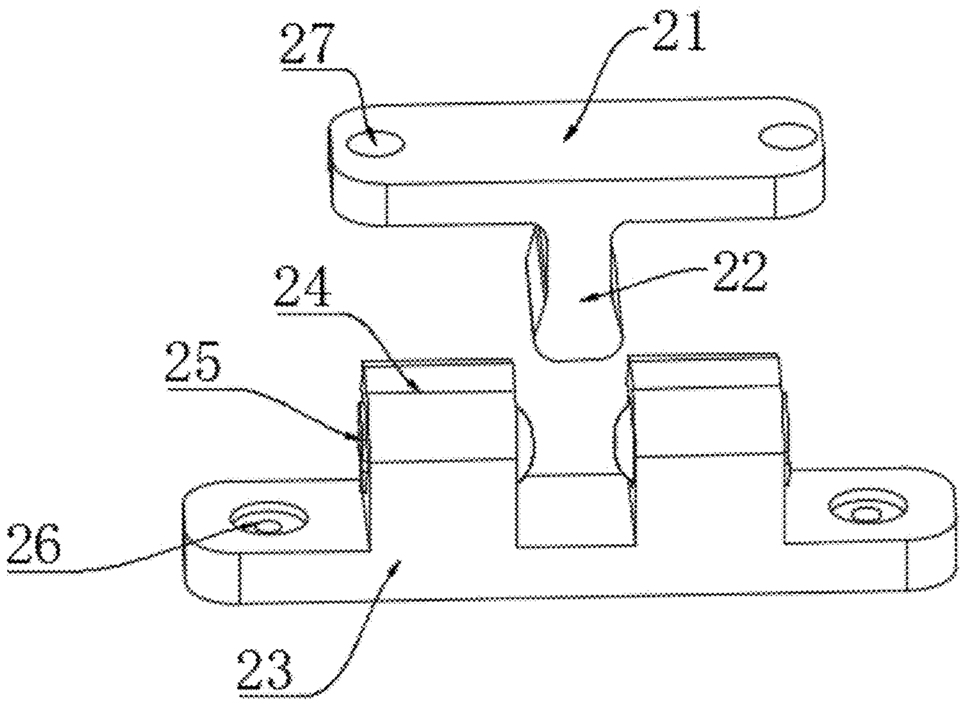
FIG. 4 is a structural schematic diagram of the quick release ball structure of the present invention when detached.
Figure 5:
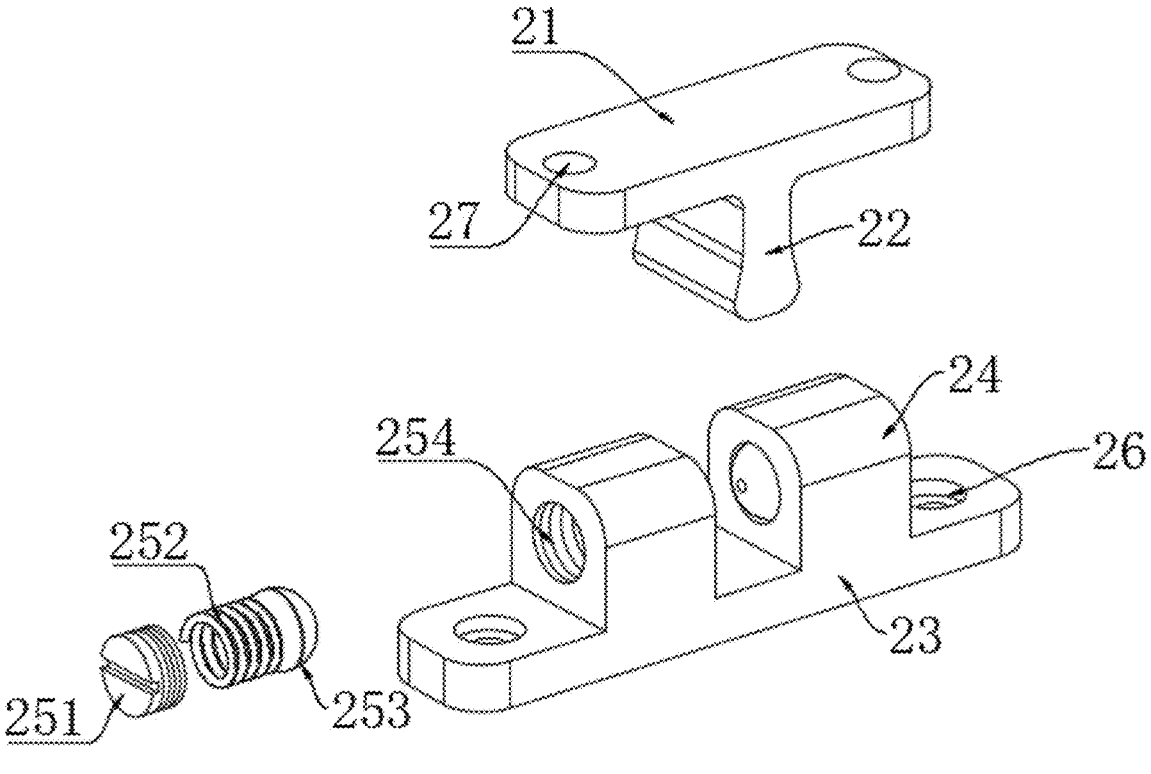
FIG. 5 is an exploded schematic diagram of the quick release ball structure of the present invention.

Legends in the FIG.s: 1. Top case; 2. Quick release ball structure; 21. Fixing plate; 22. Limit protrusion; 23. Clamping base; 24. Support unit; 25. Spring loaded ball unit; 251. Adjustment unit; 252. Spring; 253. Ball; 254. Screw hole; 26. Countersunk hole; 27. Installation hole; 3. Bottom case; 4. Middle board; 5. Type-C interface; 6. Magnetic protective cover; 7. Counterweight plate; 8. PIN magnetic connector; 81. Magnetic male socket; 82. Receiver; 83. Support unit; 84. Magnetic female socket.

DETAILED DESCRIPTION OF THE EMBODIMENTS

The technical solutions in the embodiments of the present invention will be described below clearly and in detail in combination with the Figures in the embodiments of the present invention. Obviously, the described embodiments are only part of the embodiments of the present invention, but not all of them. Based on the embodiments in the present invention, all other embodiments obtained by those skilled in the art without creative labor fall within the scope of protection of the present invention.

Refer to FIGS. 1-5. The present invention provides a technical solution: a quick release structure for a keyboard, comprising: a plurality of quick release ball structures 2 uniformly arranged around the edges of the keyboard, wherein the keyboard comprises a bottom case 3 and a top case 1 located above the bottom case 3, a middle plate 4 is disposed between the bottom case 3 and the top case 1, the middle plate 4 is fixed to the bottom case 3 via the top case 1, each quick release ball structure 2 comprises a fixing plate 21 fixed to the top case 1 and a clamping base 23 fixed to the bottom case 3, the clamping base 23 is detachably connected to the fixing plate 21 via a detachable connection mechanism, spring loaded ball units 25 are installed on both sides of the clamping base 23 for clamping and limiting the connection mechanism, and the connection mechanism is located between the two spring loaded ball units 25.

When installing, the clamping base 23 is fixed on the bottom case 3 of the keyboard, and then the fixing plate 21 is fixed on the top case 1 of the keyboard. When the clamping base 23 is connected with the fixing plate 21 via a connection mechanism, the spring clamping force between the two spring loaded ball units 25 is used to clamp and fix the connection section of the connection mechanism, so that the top case 1 and the bottom case 3 is quickly installed. When removing, the connection mechanism is detached by directly pulling the top case 1 away from the bottom case 3, and it is easy in operation, and the screw does not need to be screwed frequently, which improves the convenience of installing or removing the bottom case 3 and the top case 1.

The connection mechanism comprises a limit protrusion 22 fixed on one side of the fixing plate 21 and two support units 24 fixed on one side of the clamping base 23. The two spring loaded ball units 25 are respectively installed inside the support units 24, and when the limit protrusion 22 is located between the two support units 24, one end of the spring loaded ball unit 25 passes through the support unit 24 and is pressed against the side wall of the limit protrusion 22. When installing, the limit protrusion 22 is inserted between the two support units 24, and clamping force is disposed from the opposite sides of the limit protrusion 22 using the spring loaded ball unit 25 to fix the limit protrusion 22 between the two support units 24 and connect the clamping plate and the clamping base 23. When removing, simply pull out the limit protrusion 22 between the two support units 24, and it is easy in operation.

The limit protrusion 22 is arranged with an arc-shaped surface on the side that is pressed against the spring loaded ball unit 25. By matching the shape of the arc-shaped surface with the spring loaded ball unit 25, the limit protrusion 22 will not detach from the spring loaded ball unit 25 when not pulled by external forces while the arc-shaped surface of the limit protrusion 22 is pressed against the spring loaded ball unit 25. The limit protrusion 22 is integrally formed with the fixing plate 21, and the limit protrusion 22 forms a T-shaped structure with the fixing plate 21, and both ends of the fixing plate 21 are disposed with installation hole 27 for connecting with the top case 1. Via the installation hole 27, it is easy to fix the fixing plate 21 to the top case 1 of the keyboard in advance using screws.

The spring loaded ball structure 25 comprises a ball 253 and a spring 252. The ball 253 is fixed at one end of the spring 252, and a cavity is disposed on the support unit 24 for installing the ball 253 and the spring 252. One end of the cavity is disposed with a clearance hole for one end of the ball 253 to pass through and press against the side wall of the limit protrusion 22. The diameter of the clearance hole is slightly smaller than that of the ball 253 to prevent the ball 253 from falling out of the cavity and affecting the clamping effect on the limit protrusion 22. The other end of the cavity is arranged with an adjustment mechanism for adjusting the clamping force of the ball 253, which enables the ball 253 to have certain elasticity via the spring 252, and when the limit protrusion 22 is pressed against the ball 253, the limit protrusion 22 uses the ball 253 to provide a reverse force to the spring 252 so as to compress the spring 252, and uses the rebound force of the spring 252 to provide a clamping force to the ball 253, so as to clamp and fix the limit protrusion 22.

The adjustment mechanism comprises an adjustment unit 251, an external threaded section is arranged on the side wall of the adjustment unit 251, a screw hole 254 is disposed at the other end of the cavity for threaded connection of the adjustment unit 251, the end of the adjustment unit 251 away from the screw hole 254 is disposed with a cross notch, which facilitates the rotation of the adjustment unit 251 with the aid of a tool to adjust the length of the adjustment unit 251 entering the screw hole 254, thereby providing compression force to the spring 252 via the adjustment unit 251, and facilitating the adjustment of the elasticity coefficient of the spring 252 according to actual installation requirements, thereby adjusting the clamping force between the two spring loaded ball units 25.

The corners at the upper end of the support unit 24 are all processed as arc angles, and the two ends of the clamping base 23 are disposed with countersunk holes 26 for connection with the bottom case 3, and the countersunk holes 26 facilitate the early fixation of the spring loaded ball unit 23 on the bottom case 3, bringing convenience to the assembly of the bottom case 3 and the top case 1 of the keyboard.

Figure 6:
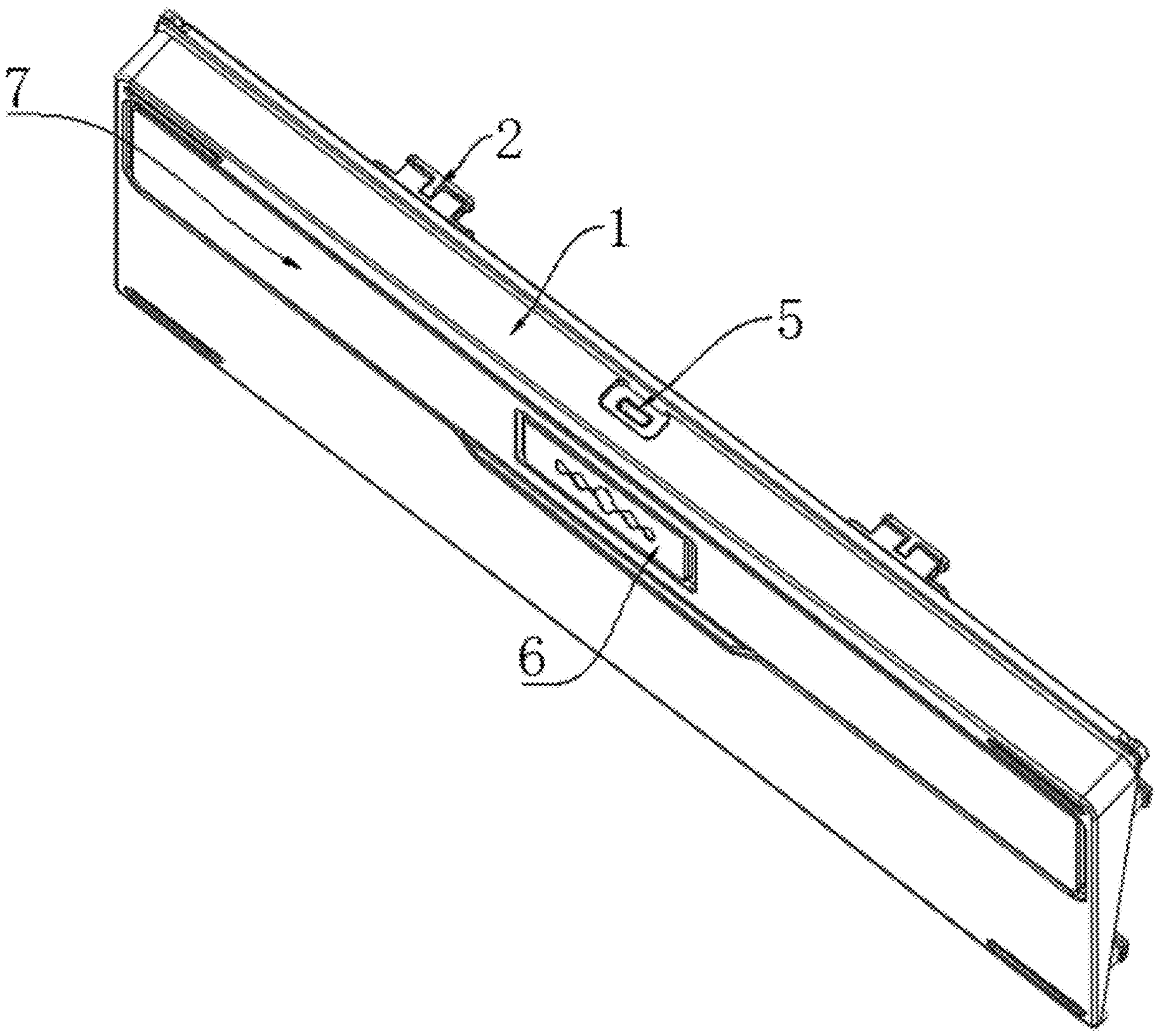
FIG. 6 is a structural schematic diagram of the bottom case of the present invention.
Figure 7:
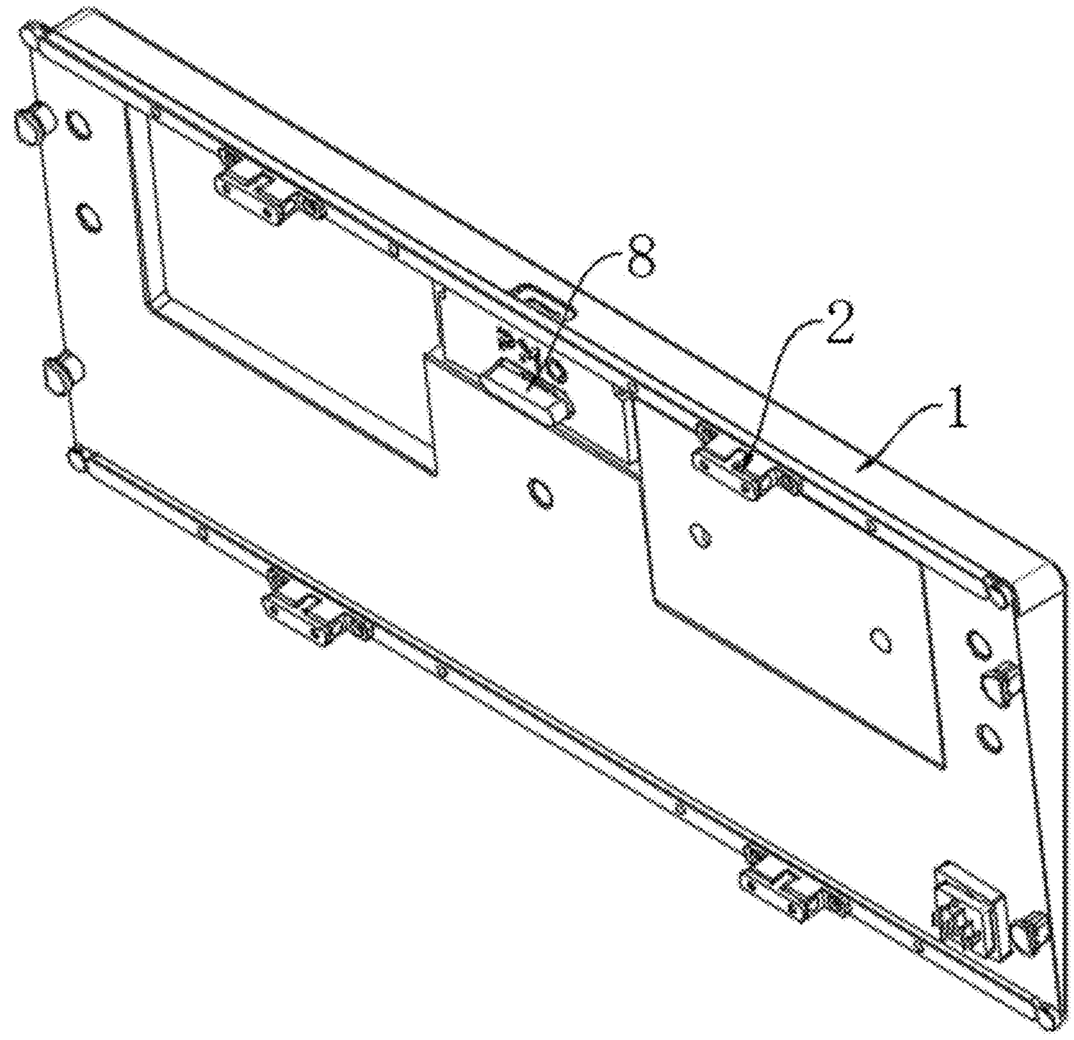
FIG. 7 is a structural schematic diagram for installation of the PIN magnetic connector and the bottom case of the present invention.
Figure 8:
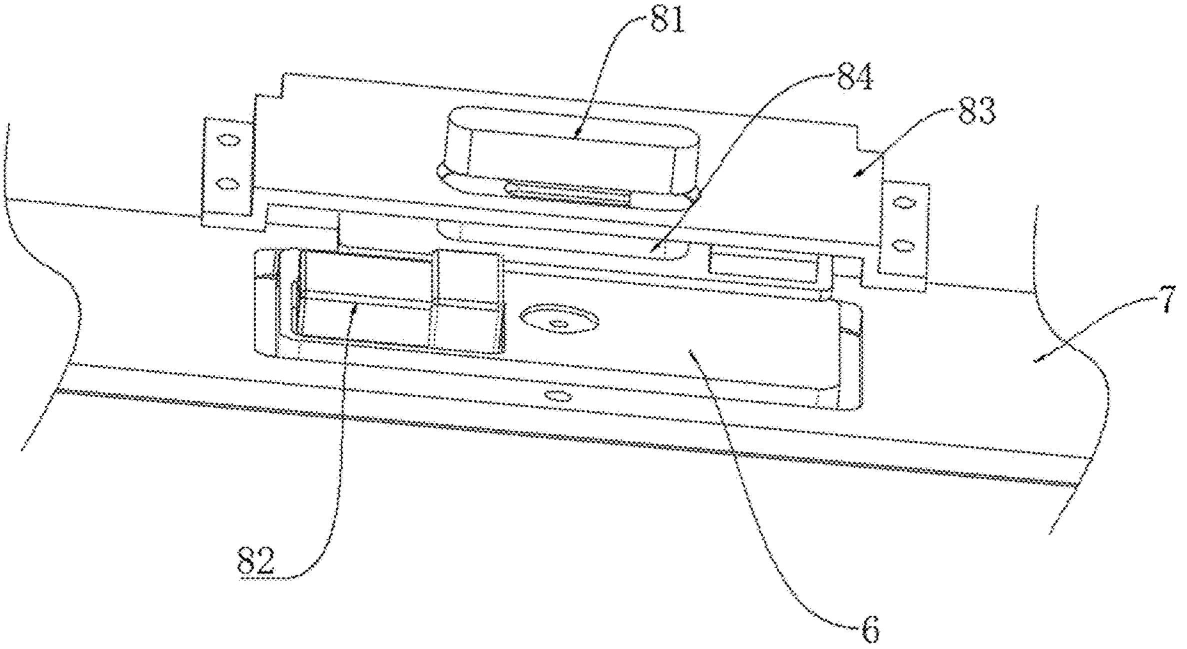
FIG. 8 is a structural schematic diagram of the PIN magnetic connector of the present invention.

As shown in FIGS. 6-8, To enable detachable connection between the circuit board inside the keyboard and the Type-C interface, the present invention further comprises a PIN magnetic connector 8 installed inside the bottom case 3. One side of the bottom case 3 is disposed with a Type-C interface 5, which is magnetically attached to the circuit board inside the keyboard via the PIN magnetic connector 8. The bottom of the bottom case 3 is disposed with a cavity for installing the PIN magnetic connector 8, and a magnetic protection cover 6 for protecting and limiting the PIN magnetic connector 8 is detachably installed at the opening of the cavity. The circuit board is electrically connected to the Type-C interface 5 via the PIN magnetic connector 8, which avoids the conventional need to use wires to connect the circuit board to the Type-C interface 5, improving the convenience of connecting the circuit board to the Type-C interface 5.

The lower surface of the bottom case 3 is also embedded with a counterweight plate 7, which is disposed with a clearance opening for the installation of the magnetic protection cover 6. The stability of the keyboard during use is improved via the arrangement of the matching plate.

The PIN magnetic connector 8 comprises a magnetic male socket 81 fixed to the circuit board inside the keyboard and a magnetic female socket 84 installed on the bottom case 3. The magnetic male socket 81 is magnetically attached to the magnetic female socket 84, the magnetic female socket 84 is fixed inside the cavity via a support unit 83, a receiver 82 is disposed between the bottom case 3 and the support unit 83, and one side of the magnetic female socket 84 is connected to the Type-C interface 5. The receiver 82 is used to achieve wireless communication of the keyboard. Via the magnetic connection between the magnetic male socket 81 and the magnetic female socket 84, the circuit board can be electrically connected to and removed from the Type-C interface 5 quickly, improving the convenience of installing and removing the circuit board.

The present invention relates to a quick release structure for a keyboard, comprising a top case and a bottom case, wherein the top case and the bottom case are detachably connected via a quick release ball structure. The quick release ball structure provides a convenient connection method for the top case and the bottom case, allowing users to quickly remove and assemble the keyboard, and the release process is relatively smooth compared to the snap on structure. The PCB board of conventional keyboards is connected to the other components inside the bottom case with ribbon cables, and extreme caution is required when removing the top case and the bottom case for the first time to avoid damaging the connecting components or ribbon cables. To achieve thorough and ultimate quick release, the PCB board and the Type-C interface inside the keyboard are connected via a PIN magnetic connector. PIN magnetic connector is an interface technology that utilizes magnetic force to achieve quick connection and disconnection. PIN magnetic connectors usually consist of two portions: the magnetic male socket (81) which is a PIN (pin) with magnetic properties, and the magnetic female socket (84) which is a magnetic socket corresponding to it. When they are close, the magnetic force can automatically align and connect them together. The quick release ball structure and the PIN magnetic connector achieve the ultimate quick release of the keyboard.

Although embodiments of the present invention have been shown and described, it can be understood for those skilled in the art that various changes, modifications, substitutions, and variations can be made to these embodiments without departing from the principles and spirit of the present invention, and the scope of the present invention is defined by the accompanying claims and their equivalents.

What is claimed is:

1. A quick release structure for a keyboard, characterized in that: the quick release structure comprises a top case (1) and a bottom case (3), wherein the top case (1) and the bottom case (3) are detachably connected via a quick release ball structure (2), wherein the quick release structure further comprises a PCB board, one side of the bottom case (3) is disposed with a Type-C interface (5), and the PCB board is connected to the Type-C interface (5) inside the keyboard via a PIN magnetic connector, and wherein the PIN magnetic connector (8) comprises a magnetic male socket (81) fixed to the circuit board inside the keyboard and a magnetic female socket (84) installed on the bottom case (3), the magnetic male socket (81) is magnetically attached to the magnetic female socket (84), the magnetic female socket (84) is fixed inside the cavity via a support unit (83), a receiver (82) is arranged between the bottom case (3) and the support unit (83), and one side of the magnetic female socket (84) is electrically connected to the Type-C interface (5).

2. A quick release structure for a keyboard according to claim 1, characterized in that: the quick release ball structure (2) comprises a lock unit and clamping base (23), wherein the lock unit is disposed with an arc-shaped surface, the clamping base (23) is disposed with a pair of support units (24) forming a clamping opening, the two support units (24) are arranged with a spring loaded ball unit (25) inside, and the lock unit is inserted into the two support units (24) and locked by the spring loaded ball unit (25).

3. A quick release structure for a keyboard according to claim 2, characterized in that: the spring loaded ball unit (25) comprises a ball (253) and a spring (252), a cavity is disposed on the support unit (24) for the installation of the ball (253) and the spring (252), at least a portion of the ball (253) is exposed outside the cavity, and the ball (253) located in the cavity is pressed against one end of the spring (252); the other end of the spring (252) is arranged with an adjustment mechanism for adjusting the clamping force of the ball (253).

4. A quick release structure for a keyboard according to claim 3, characterized in that: the adjustment mechanism comprises an adjustment unit (251), the side wall of the adjustment unit (251) is disposed with an external threaded section, and the cavity is disposed with a screw hole (254) for the adjustment unit (251) to be screwed in.

5. A quick release structure for a keyboard according to claim 1, characterized in that: the lock unit comprises a fixing plate (21) arranged around the edge of the top case (1) and a limit protrusion (22) arranged on the fixing plate (21), and the curved surfaces are arranged on both sides of the limit protrusion (22).

6. A quick release structure for a keyboard according to claim 5, characterized in that: the cross-section of the curved surface is in an arc shape, and the curved surface corresponds to the spring loaded ball unit (25).

7. A quick release structure for a keyboard according to claim 5, characterized in that: the limit protrusion (22) is integrally formed with the fixing plate (21), and the limit protrusion (22) and the fixing plate (21) form a T-shaped structure.

8. A quick release structure for a keyboard according to claim 7, characterized in that: the bottom of the bottom case (3) is disposed with a cavity for installing a PIN magnetic connector (8) and accommodating the receiver, and a magnetic protective cover (6) is detachably installed at the opening of the cavity.

* * * * *